2,757,098
Patented July 31, 1956

2,757,098
PRODUCT AND PROCESS

Kenneth L. Berry and Robert M. Joyce, Jr., Hockessin, and James E. Kirby, Wilmington, Del., assignors to E. I. du Pont de Nemours and Company, Wilmington, Del., a corporation of Delaware No Drawing. Application March 6, 1952, Serial No. 275,236

7 Claims. (Cl. 106—288)

The invention relates to surface-modified finely divided siliceous solids and to processes for making them. More particularly, it relates to siliceous particles having an average specific surface area of at least 1 square meter per gram, having chemically bound to the silicon atoms on the surface of said particles at least one —OR group per square millimicron of surface area of the siliceous solid, where R is a substituted hydrocarbon radical in which the carbon attached to oxygen is also attached to at least one hydrogen atom, said substituted hydrocarbon radical containing an acidic substituent group, each R radical having from 2 to 18 carbon atoms.

According to the present invention dense particles of inorganic siliceous material having an average specific surface area of at least 1 square meter per gram are surface-modified by chemical reaction with a substituted primary or secondary monohydric alcohol having from 2 to 18 carbon atoms and containing an acidic substituent group. The alcohol reacts preferentially through the hydroxyl group effecting surface esterification.

The products of this invention are a specific kind of pulverulent solids. Some of the products are referred to hereafter as estersils. Estersils are solids made by chemically reacting alcohols with certain super colloidal siliceous solids. The reaction is called esterification and the chemically bound —OR groups containing an acidic substituent group resulting therefrom are called substituted ester groups.

For a detailed description of estersils prepared from primary and secondary unsubstituted monohydric alcohols, reference is made to the copending U. S. application of Ralph K. Iler, Serial No. 171,759, filed July 1, 1950, now abandoned, and to U. S. Patent 2,657,149, issued October 21, 1952, to Ralph K. Iler, in which estersils of that class are claimed.

THE SUBSTRATE

The materials used to form the skeleton or internal structure, the so-called substrate, of the products of this invention are solid inorganic siliceous materials. They contain substantially no chemically bound organic groups. They have reactive surfaces which are believed to result from surface silanol (—SiOH) groups. The substrate materials can be mineral or synthetic in origin. They can be amorphous silica. They can be water-insoluble metal silicates. They can be water-insoluble metal silicates coated with amorphous silica.

For the purposes of this invention the substrate particles should have an average diameter greater than about 1 millimicron. Substrate particles in which the ultimate units have diameters of at least 5 millimicrons but less than 100 millimicrons are preferred. Another preferred type of substrate particles are supercolloidal aggregates or pulverulent solids.

It is further preferred that the inorganic siliceous solids be porous, that is, they should have exposed surfaces in the interior of the particle which are available to the exterior so that liquids and gases can penetrate the pores and reach the exposed surfaces of the pore walls. In other words, the solid forms a three-dimensional network or webwork through which the pores or voids or interstices extend as a labyrinth of passages or open spaces.

Especially preferred are porous inorganic siliceous solids having average pore diameter of at least four millimicrons. The large pores afford easy access for alcohol molecules in the subsequent esterification to give the products of the invention.

The substrate particles have large surface areas in relation to their mass. The term used herein and the one normally so used in the art to express the relationship of surface area to mass is "specific surface area." Numerically, specific surface area will be expressed in square meters per gram ($m.^2/g.$).

According to the present invention, the substrate particles have an average specific surface area of at least 1 square meter per gram and preferably the average specific surface area is at least 25 $m.^2/g$. In the case of precipitated amorphous silica, a preferred material, there is an optimum range of about 200 to 400 $m.^2/g.$, based on the fact that in this range the supercolloidal particles or aggregates can be obtained in a dry state without bringing about a considerable collapse of the porous structure by replacing the water with a water-miscible organic solvent such as acetone and then drying. This powder is especially suitable for subsequent esterification. It is, of course, possible to produce very voluminous aerogels by processes of the prior art, having surface areas of from 200 to 900 $m.^2/g$. Such highly porous forms of silica can be surface-esterified by the process of this invention.

Specific surface area, as referred to herein, is determined by the accepted nitrogen adsorption method described in an article "A new method for measuring the surface areas of finely divided materials and for determining the size of particles" by P. H. Emmett in Symposium on New Methods for Particle Size Determination in Sub-Sieve Range, published by the Americain Society for Testing Materials, March 1951, page 95. The value of 0.162 square millimicron for the area covered by one surface adsorbed nitrogen molecule is used in calculating the specific surface areas.

Pore diameter values are obtained by first determining pore volume from nitrogen adsorption isotherms as described by Holmes and Emmett in Journal of Physical and Colloid Chemistry 51, 1262 (1947). From the volume figure, the diameters are obtained by simple geometry assuming cylindrical pore structure.

Determinations of gross particle size and shape of substrate material are suitably made by a number of standard methods whose choice for use in a particular case depends upon the approximate size and shape of the particles and the degree of accuracy desired. Thus, for coarse materials, the dimensions of individual particles or coherent aggregates can be determined with the unaided eye and ruler or calibers. For more finely powdered material, the light microscope is used with a calibrated scale. For materials having a particle size in the range of from 2 or 3 microns down to 5 millimicrons, the electron microscope is used. Particle size determination using an electron microscope is described in detail by J. H. L. Watson in Analytical Chemistry 20, 576 (1948).

While various inorganic siliceous solids having the aforementioned properties can be used as substrate materials in preparation of the products of this invention, precipitated amorphous silica is particularly preferred. Such silica is characterized by X-rays as lacking crystalline structure.

The preparation of several suitable amorphous silicas is illustrated in the examples. For a detailed discussion of sources of amorphous silica for use in preparing estersils of primary and secondary alcohols, reference should be had to the copending U. S. application of R. K. Iler, Serial No. 171,759, filed July 1, 1950.

Instead of silica, water-insoluble metal silicates can be used as the substrate. Such metal silicates can be prepared, as is well known in the prior art, by treatment of silicas with metal salts or hydrous metal oxides, excluding those containing only alkali metal ions. Such metal silicates can be prepared so as to have a large number of silanol (—SiOH) groups on the surface of the particle. Thus metal silicates having a large proportion of metal ions on the surface may be activated for esterification by washing with acids to remove at least a portion of the metal ion and leave surface silanol groups.

Crystalline metal silicates occurring in nature can also be used. However, the proportion of silanol groups on most minerals is very small since the surfaces also contain metal hydroxy groups, silicon oxygen groups and adsorbed metal ions. Therefore, before esterification it is necessary to introduce silanol groups on the surface. Loosely adsorbed metal ions may be exchanged for hydrogen ions by washing the dilute acids or by treatment with ion exchange resins. In some cases, more vigorous treatment, such as reaction with acids at low pH and often at elevated temperatures are required to give a material which will contain a sufficient number of silanol groups in the surface to yield an organophilic product on esterification.

Alternatively or additionally, silanol groups can be introduced on the surface of metal silicates by coating them with a layer of amorphous silica. This is accomplished by treating, say, sodium silicate with an acid in the presence of the mineral silicate particles under such conditions that the silica formed will deposit as a coating on the mineral particle.

Mineral crystalline silicates which can be used in preparing the substrate particles are as follows: the asbestos minerals, such as chrysotile asbestos and serpentine (hydrous magnesium silicate) and amphiboles such as crocidolite asbestos (a sodium magnesium iron silicate), amosite (an iron silicate), tremolite (a calcium magnesium silicate), and anthothyllite (a magnesium iron silicate); clay materials, such as halloysite (an aluminum silicate), attapulgite (a magnesium aluminum silicate), hectorite (a magnesium lithium silicate), nontronite (magnesium aluminum iron silicates); the kaolins, such as kaolinite, nacrite and dickite (aluminum silicates); and bentonites, such as beidillite, saponite and montmorillonite (magnesium aluminum iron silicates); and micaceous minerals, such as phlogopite (a potassium magnesium aluminum silicate), muscovite (a potassium aluminum silicate), biotite (a potassium iron aluminum silicate) and vermiculite (a hydrous magnesium iron aluminum silicate).

THE ESTERIFYING AGENT

The inorganic siliceous solids described above are reacted with substituted primary and secondary monohydric alcohols to give the products of the invention.

The alcohols herein called esterifying agents are represented by the formula ROH where R is a substituted hydrocarbon radical in which the carbon atom attached to the oxygen of the hydroxyl group is also attached to at least one hydrogen, the hydrocarbon radical having from 2 to 18 carbon atoms and containing an acidic reacting substituent group.

When it is said that the esterifying agents used in the process of the invention are primary or secondary monohydric alcohols containing an acidic substituent group, it is meant to include as suitable alcohols gamma- and delta-hydroxy acids in their conventional form of lactones. The tendency to form the lactone is so marked that the majority of the gamma- and delta-hydroxy acids are known only in the form of the lactone. It will be understood that for the purposes of this invention the lectones are equivalent to carboxy substituted alcohols.

By "an acidic substituent group" is meant a group which can form salts with strong bases. In other words, these acidic groups are capable of undergoing neutralization in the conventional way.

As examples of suitable acidic substituent groups there may be named carboxyl group, mercapto group, phenolic group, sulfonic group, phosphonic group, arsonic group and carbamic group.

It will be observed that the acidic reaction substituent group of the esterifying agent should be substantially exposed so that its acidic properties are not masked by the surrounding hydrocarbon chains. It will also be understood that an esterifying agent having more than one of the suitable acidic reacting substituent groups can be used. The acidic groups of a single alcohol do not of necessity need to be identical.

Examples of esterifying agents which can be used in a process of the invention include para-hydroxybenzyl alcohol, 12-hydroxystearic acid, 6-hydroxyhexanoic acid, hydroxyethylsulfonic acid, beta-mercaptoethanol, 4-mercaptobutanol, glycollic acid, lactic acid, malic acid, hydroxyethylarsonic acid, gamma-butyrolactone, beta-propiolactone, gamma-valerolactone, hydroxyheptylcarbamic acid and hydroxyethylphosphonic acid.

Technically, there is no upper limit to the number of carbon atoms which may be present in the esterifying agent. As a practical matter, however, the group of alcohols having from 2 to 18 carbon atoms include the majority of commercially available alcohols and offer a selection of molecule sizes which should be adequate for any purpose.

Substituted alcohols containing from 3 to 8 carbon atoms are especially preferred because they are relatively low boiling liquids which are most readily handled in the process. When present as unreacted excess they can be most readily removed from the esterified product by drying in a vacuum oven without the necessity of extraction procedure. Additionally, they are also the most economic to use and yield a product having a low ratio of organic matter through silica.

The esterifying agent need not be a single alcohol. Mixtures of substituted alcohols can be used. Thus, when a variety of surface properties is desired, a mixture of alcohols may be used provided, of course, that they are compatible with one another. Also there can be a mixture of different chain lengths found in the technical grade of some alcohols. And, if desired, a mixture consisting of an unsubstituted primary or secondary alcohol and an alcohol containing an acidic substituent group can be used.

ESTERIFICATION

The siliceous substrate to be reacted with the alcohol containing an acidic reacting group must contain surface silanol groups. Pure amorphous silica which has been in contact with moisture has such a surface. The surface must not be covered with other materials which block access to the silanol group. Metal ions on the surface of metal silicates must be exchanged for hydrogen atoms. This can be done by treatment with a hydrogen form of a cation exchange resin or by treatment with an acid as mentioned heretofore. Alternatively, the particles can be coated with a thin layer of silica. The external surface can then be reacted with alcohol.

The inorganic siliceous solid is preferably freed of extraneous material before esterification, and the pH is adjusted to avoid strong acids or alkalis in the reaction. The pH is preferably 5 to 8.

The amount of water present in the reacting mass during the esterification step has an important bearing on the degree of esterification that will be obtained. Thus, since the esterification process is an equilibrium reaction, it is ordinarily desirable to keep the water content as low as possible during the course of the reaction.

In order to esterify sufficiently to obtain a high proportion of substituted ester groups on the surface of the siliceous particles, the water in the liquid phase of the system should not exceed about 5% by weight of that phase. For maximum esterification, the water content must be kept below about 1.5%. As already mentioned, it is desirable to keep the water content as low as possible.

Because of the hindering effect of water on the esterification, if the siliceous solid to be esterified is wet, the free water must be removed either before the solid is put into the alcohol or alternatively it may be removed by distillation after mixing with the alcohol.

Simple air drying at temperatures of from 100 to 150° C. will remove most of the free water. Drying may be hastened by the application of vacuum. For many types of siliceous solids, however, air drying is not satisfactory because they tend to shrink to hard, compact masses upon drying from water.

Water can suitably be removed from a wet siliceous solid before esterification by displacing the water in the wet mass with a polar organic solvent such as acetone. The solvent can later be recovered.

Preferably, water is removed from wet siliceous solids prior to esterification by azeotropic distillation. Thus, water-wet cake can be mixed with a polar organic solvent such as methyl ethyl ketone and the mixture distilled until the system is freed from water. The organic solvent can then be evaporated to give a dry product for reaction with alcohol.

Alternatively, the alcohol which is to be used as the esterifying agent can also be used in some instances as the azeotropic dehydrating agent.

The ratio of alcohol and siliceous material to be used in the esterification is limited only by the fact that the alcohol should be present in sufficient excess to facilitate a practical rate of reaction. Preferably, sufficient alcohol is used to provide a slurry of the siliceous material in alcohol which can be readily stirred. Of course, larger portions of alcohol must be used when no water is removed from the system during the reaction. The reason for this is that the reaction liberates water and the water content may exceed the maximum permissible value unless alcohol is added either before or during the reaction step.

In general, it is sufficient, to carry out the esterification by simply refluxing the mixture of the silica and the alcohol together for a suitable length of time, for example, upwards of 2 hours. In cases where the alcohol is somewhat unstable, it may be desirable to carry out the esterification at somewhat lower temperatures than the boiling point of the alcohol in order to prevent the excessive decomposition in the liquid phase. A preferred method of using unstable alcohols as esterifying agents comprises "heat-activating" the silica and chemically reacting the alcohol with the resulting surface-activated silica in accordance with the invention described and claimed in the copending application of Max T. Goebel, Serial No. 261,140, filed December 11, 1951.

In addition, when the alcohol to be used is rather low boiling, that is, less than 100° C., in order to promote more complete reaction than could be realized at the boiling point, it may be desired to carry out the esterification in the autoclave at temperatures of from 200–300° C.

The extent of the reaction is fixed more by the temperature than by the time, that is, at a suitable temperature the esterification reaction proceeds quite rapidly up to a certain point which is characteristic of the temperature and of the alcohol and thereafter proceeds slowly.

The minimum reaction time and temperature in order to obtain any given extent of reaction varies with the alcohol used. While it is difficult to set forth in great detail the relationship between the temperature required for any given extent of reaction and the structure of the alcohol, one skilled in the art may learn from the data the general principles involved and conclude what conditions should be used for another alcohol.

The temperatures substantially below about 100° C. are not suitable in most instances. Alcohol can be adsorbed on the unsaturated siliceous surface at such temperatures but true esterification is not obtained.

The esterification temperature should not exceed the thermal decomposition point of the alcohol while in the presence of siliceous solids. Nor should it exceed the point of thermal stability of the esterified siliceous materials. Preferably, the heating is not prolonged any more than is required to achieve esterification equilibrium.

As already indicated, the reaction between amorphous silica and liquid alcohols can be carried out by autoclaving a slurry of the silica in an excess of the organic reagent. However, when the alcohol is high melting, or unstable above its melting point, it is preferred to carry out the reaction in a dilute solution, say, 10% of the organic reagent in an inert solvent, such as, for instance, benzene, toluene, xylene, trichloroethylene, dioxane and dibutylether of ethylene glycol.

Whether the reaction is effected at atmospheric pressure at the reflux temperature of the solution or under autoclave conditions will largely depend on the boiling point of the solvent used; that is, whether the boiling point is high enough to effect substantial reaction between the silica and the esterifying agent. Occasionally, it is desirable to deposit a mono layer of the high boiling or solid alcohol uniformly over the silica surface by stirring the latter with a solution of the alcohol in a low boiling, inert solvent such as ether or acetone, and then evaporating the solvent while maintaining constant agitation. Complete reaction is then effected by heating the dry coated product to a temperature sufficiently high to cause removal of water.

After completion of the esterification, the product esterils can be removed from the unreacted alcohol by conventional methods. Thus, the separation can be made by filtration since the esterils consist of particles of supercolloidal size which are retained on ordinary filter media.

Alternatively, the alcohol can be vaporized by applying vacuum to the reaction vessel. Or where the alcohol is one which will distill at atmospheric pressure without decomposition, simple distillation can be used. In the case of higher alcohols which are not readily distilled, except under very high vacuum, the alcohol can be extracted from the product with a low boiling solvent such such as, for instance, methyl ethyl ketone, chloroform or ether.

PROPERTIES AND USES OF THE PRODUCTS

The products of the invention are in the form of powders of sometimes lumps or cakes which are pulverable under the pressure of the finger or by a light rubbing action. The esterified inorganic siliceous solids are generally exceedingly fine, light, fluffy, voluminous powders.

The esterification reaction does not substantially change the structure of the inorganic siliceous solid or substrate which was esterified. In other words, the internal structure of the estersil, the structure to which the —OR groups are chemically bound, has substantially the same particle size, surface area, pore diameter and other characteristics described previously in the discussion of the substrate material. The estersils of the invention are in a supercolloidal state of subdivision.

The products of the invention can be hydrophilic or organophilic depending on the degree of esterification and also on the type and number of acidic substituents per —OR group. The presence of the acidic substituent may be demonstrated by chemical analysis. The surface properties of the resultant estersils reflect the presence of acidic groups on the surface.

By the term "organophilic" is meant that when a pinch of estersil is shaken in a two-phase liquid system of water and n-butanol in a test tube the product will "wet" into the n-butanol phase in preference to the water-phase.

The number of ester groups for 100 square millimicrons of siliceous substrate surface is calculated from the expression:

$$\text{Surface area} = \frac{6.02 \times 10^{23} \times C}{12n \times S_n \times 10^{18}} = \frac{50,200 \times C}{n \times S_n}$$

where $C$ is the weight of the carbon in grams attached to 100 grams of substrate; $n$ is the number of carbon atoms in the —OR groups; $S_n$ is the specific surface area in m.$^2$/g. of the substrate as determined by nitrogen adsorption.

Where the sample to be analyzed is one in which the type of alcohol is unknown, the sample can be decomposed with an acid and the alcohol can be recovered and identified. The specific surface area of the substrate can be determined by first burning off the ester groups, as for example, by slowly heating the estersil in a stream of oxygen up to 500° C. and holding it at that temperature for a period of about three hours and then rehydrating the surface of the particles by exposure to 100% relative humidity at room temperature for several hours and finally determining the surface area of the remaining solid by nitrogen adsorption method.

In the products of the invention the —OR groups are chemically bound to the substrate. The products should not be confused with compositions in which an alcohol is merely physically adsorbed on the surface of the siliceous solid. Adsorbed alcohols can be removed by heating the material at relatively low temperature, for example, 150° C. under high vacuum, say 10$^{-5}$ millimeters of mercury for a period of one hour. In contrast, the products of this invention are stable under such treatment. Neither can the ester groups be removed by washing with hot methyl ethyl ketone or similar solvents or by prolonged extraction in a Soxhlet extractor. In case of ordinary physical adsorption the alcohol is displaced by such treatment.

The products of the invention are useful as selective adsorbents, particularly for basic materials such as proteins, amines and dyes. They can also be used as fillers for polymeric materials. Where the polymers contain basic substituents they may react with the acidic substituents on the estersil surface forming a chemically integrated structure.

The invention will be better understood by reference to the following illustrative examples:

*Example 1*

This is an example of a process of the invention in which a high surface area amorphous particulate silica powder is esterified with p-hydroxybenzyl alcohol.

A water-wet filter cake containing about 6% silica in the form of finely-divided, precipitated, reinforced aggregates of silica is prepared in the following manner:

A 425-pound portion of a sodium silicate solution containing 2.39 grams of SiO$_2$ per 100 milliliters of solution and having a molar SiO$_2$:Na$_2$O ratio of 3.25:1 was charged to a 100-gallon steel tank equipped with a one-half horsepower, 400 R. P. M. "Lightnin" mixer driving a 10″ diameter, three-bladed propeller. The silicate is heated to a temperature of 35±2° C. by steam-injection. A sufficient amount (about 162 pounds) of a solution containing 2.40 per cent sulfuric acid was added uniformly over a period of about 30 minutes to bring the pH to 9.7±0.2 as measured at 25° C. During this period the temperature of the reacting mass was maintained below 40° C.

The amount of acid added during the aforementioned step of the process is equivalent to about 80% of the Na$_2$O in the original sodium silicate. The sodium ion content remains below 0.3 N throughout the process. The clear sol thus obtained is heated to 95° C. in about fifteen minutes. After heating, the sol contains discrete ultimate silica units which are about 5–7 millimicrons in diameter. They have a pH of about 10.1.

Solutions of sodium silicate and sulfuric acid are then added simultaneously at a uniform rate over a period of two hours through inlets located close to the vortex formed by the agitator. An 85.4-pound portion of the sodium silicate solution is used, which contains 13.22 grams of SiO$_2$ per 100 milliliters of solution and has a molar SiO$_2$:Na$_2$O ratio of 3.25:1. The sulfuric acid is a 4.65 per cent aqueous solution and is added in an amount to maintain the pH of the reaction mixture at 10.3±0.2 as measured at 25° C. throughout the course of the reaction. Such an amount is sufficient to neutralize about 80% of the Na$_2$O in the silicate solution and maintain the sodium ion concentration below 0.3 N throughout the process. The temperature is maintained at 95° C. throughout the addition of acid and silicate.

During the heating of the initial sol the tiny, discrete particles of the sol increase in size. Then, during the initial addition of silicate and acid they may become chemically bound together in the form of open networks or coherent aggregates of supercolloidal size, wherein the colloidal particles are present as dense ultimate units. The aggregates are precipitated. In the subsequent simultaneous addition of silicate and acid the aggregates are reinforced. Since about one part of silica is added for each part of silica in the original sol, the build-up ratio on the aggregates is about 1:1.

Still maintaining a temperature of 95° C. the pH of the solution is adjusted from 10.3 to 5.0 by adding 4.65 per cent sulfuric acid at a rate of about 0.24 gallon per minute for 20 minutes and then adding small portions followed by repeated pH determinations until the pH is 5 as measured at 25° C. This requires about 32 pounds of the sulfuric acid solution.

The slurry thus obtained is then maintained at a temperature of from 85 to 95° C. without agitation for a period of four hours. This is to further coagulate the precipitate to aid in filtration. The precipitate is filtered in several portions on a 50-gallon Nutsche, using nylon cloth as a filter medium. The filter cake is washed on the filter with five displacements of cold water and then sucked as dry as the apparatus permits. The final filter cake contains between 6 and 7 per cent solids. Its pH is adjusted to a pH of 2 to 3 and stored.

A 400-gram portion of the cake is reslurried in water and adjusted to a pH of 5.5 with sodium hydroxide. The resulting slurry is filtered. The wet cake is collected and washed repeatedly with anhydrous acetone until the water content of the wet silica is less than 1.5 per cent as measured by titration with Fischer reagent. The silica-acetone slurry is filtered. The silica collected and dried in a vacuum oven at a temperature of 125° C. for a period of 16 hours. The resulting silica is a free flowing, white, hydrophilic powder.

One hundred grams of the silica powder is added to a solution of 25 grams of p-hydroxybenzyl alcohol in 1000 grams of the dibutyl ether of ethyleneglycol. The resulting slurry is stirred for half an hour at normal room temperature and is then transferred to a 2000 cc. autoclave and pressured for a period of about thirty minutes at 250° C. under autogenous pressure. The slurry is discharged from the autoclave and the esterified silica is collected upon filtration. The esterified product is washed exhaustively with acetone and ether, and is finally dried in a vacuum oven at a temperature of 100° C. for a period of 16 hours.

The product contains about 10.5% carbon which corresponds to a degree of esterification of about 250 p-hydroxybenzyl alcohol molecules per 100 square millimicrons of surface. When the product is slurried in water, the presence of acidic phenol groups attached to the silica surface thru the grouping —CH$_2$O— can be observed by a substantial lowering of the pH of the slurry.

*Example 2*

This example illustrates the reaction between an amorphous silica powder of high surface area and a compound which leads to surface coverage by a carboxy substituted hydrocarbon chain. While a carboxy substituted alcohol may be employed as the esterifying agent, it is preferred to use for surface coverage the corresponding lactone, as here illustrated. The lactones are much more readily available and their physical properties are such as to allow the reaction to take place more conveniently.

Fifty grams of a dried silica powder obtained by displacement of water from a wet silica cake as described in Example 1 are mixed with 750 grams of butyrolactone. The resulting slurry is heated to boiling in a container equipped with a reflux condenser. The temperature of the slurry is maintained at 206° C. for a period of about six hours. The silica thus treated is collected by filtering the slurry. The product is washed exhaustively with anhydrous ether.

Analysis of the dried silica product shows that it contains about 7% carbon which corresponds to a degree of esterification of about 275 carboxy substituted butoxy groups per 100 square millimicrons of surface. Evidence of the presence of carboxy groups in exposed positions on the surface of the silica particles is found by passing a mixture of ammonia gas and nitrogen over the silica contained in a glass tube and titrating the off-gases with standard hydrochloric acid. It is found that the ammonia content of the nitrogen gas stream is substantially lowered by contact with the acidic silica surface.

*Example 3*

This is an example of a process of this invention wherein a siliceous solid is esterified with a mercapto alcohol.

A silica powder is obtained by the gelation of a commercially available 30% silica sol consisting of 17 millimicron colloidal particles and known at "Ludox" colloidal silica and by drying the resulting gel at a temperature of 110° C. for a period of 24 hours at a pH of about 4.5. Products of this character are described and claimed in the copending U. S. application of Max F. Bechtold and Omar E. Snyder, Serial No. 256,142, filed November 13, 1951.

The dried material is micropulverized to a free-flowing powder.

A portion of the aforementioned powder is heated in a muffle furnace in the presence of air for a period of one hour at a temperature of 600° C. The heat treatment activates the siliceous surface towards reaction with an alcoholic group.

Upon removal from the furnace, the activated silica is introduced into a quantity of beta mercapto ethanol. The resulting slurry is heated to a temperature of about 150° C. and held at this temperature for a period of 2 hours. The surface-esterified silica is recovered from the fluid medium by filtration, washed exhaustively with ethyl ether and dried in vacuum at a temperature of 100° C. for about 16 hours.

While the appearance of the silica is substantially unchanged, chemical analysis indicated that the treated silica contains 1.44% carbon, and 1.58% sulfur. The surface area as determined by nitrogen adsorption is found to be about 175 m.$^2$/g. This corresponds to a degree of surface coverage of about 170 mercapto ethoxy groups per 100 square millimicrons of silica surface.

We claim:

1. A solid consisting essentially of substrate particles of inorganic siliceous material in a very fine state of subdivision having an average specific surface area of from 1 to 900 square meters per gram and an average particle diameter greater than about 1 millimicron, having chemically bound to the silicon atoms on the surface of said particles at least 100 —OR groups per 100 square millimicrons of surface area of the siliceous material, where R is a substituted hydrocarbon radical in which the carbon attached to oxygen is also attached to at least one hydrogen atom, said substituted hydrocarbon radical containing an acidic substituent group selected from the class consisting of carboxylic, mercaptan, phenolic, sulfonic, phosphonic, arsonic and carbamic groups, each R radical having from 2 to 18 carbon atoms.

2. A pulverulent solid consisting essentially of substrate particles of inorganic siliceous material in a supercolloidal state of subdivision having an average specific surface area of from 1 to 900 square meters per gram and an average particle diameter greater than about 1 millimicron, having chemically bound to the silicon atoms on the surface of said particles at least one —OR group per square millimicron of surface area of the siliceous material, where R is a substituted hydrocarbon radical in which the carbon attached to oxygen is also attached to at least one hydrogen atom, said substituted hydrocarbon radical containing an acidic substituent group, the acidic group being selected from the class consisting of carboxylic, mercaptan, phenolic, sulfonic, phosphonic, arsonic and carbamic groups, each R radical having from 2 to 18 carbon atoms.

3. A powder consisting essentially of substrate particles of amorphous silica in a supercolloidal state of subdivision having an average specific surface area of from 25 to 900 square meters per gram and an average particle diameter greater than about 1 millimicron, having chemically bound to the silicon atoms on the surface of said particles at least 100 —OR groups per 100 square millimicrons of surface area of substrate surface, where R is a substituted hydrocarbon radical in which the carbon attached to oxygen is also attached to at least one hydrogen atom, said substituted hydrocarbon radical containing an acidic substituent group selected from the class consisting of carboxylic, mercaptan, phenolic, sulfonic, phosphonic, arsonic and carbamic groups, each R radical having from 2 to 18 carbon atoms.

4. A powder consisting essentially of substrate particles of amorphous silica in a supercolloidal state of subdivision having an average specific surface area of from 200 to 900 square meters per gram and an average particle diameter greater than about 1 millimicron, having an average pore diameter of at least 4 millimicrons, and having chemically bound to the silicon atoms on the surface of said particles at least one —OR group per square millimicron of surface area of the siliceous material, where R is a substituted hydrocarbon radical in which the carbon attached to oxygen is also attached to at least one hydrogen atom, said substituted hydrocarbon radical containing an acidic substituent group selected from the class consisting of carboxylic, mercaptan, phenolic, sulfonic, phosphonic, arsonic and carbamic groups, each R radical having from 2 to 18 carbon atoms.

5. A process which comprises the step of chemically reacting an alcohol of the formula ROH in which R is a substituted hydrocarbon radical having from 2 to 18 carbon atoms, wherein the carbon atom attached to oxygen is also attached to at least one hydrogen, said radical containing an acidic substituent group selected from the class consisting of carboxylic, mercaptan, phenolic, sulfonic, phosphonic, arsonic and carbamic groups, with an inorganic siliceous material in a very fine state of subdivision having an average specific surface area of from 1 to 900 square meters per gram, an average particle diameter greater than about 1 millimicron, and a pH of about from 5 to 8, and having a reactive surface containing groups selected from the class consisting of silanol and heat-activated silicon-oxygen groups, while maintaining the water content of the system below about 5 per cent by weight of the alcohol in the system and the temperature in the range from 100° C. to the thermal decomposition temperature of the alcohol.

6. A process which comprises the step of chemically reacting an alcohol of the formula ROH in which R is a substituted hydrocarbon radical having from 2 to 18 carbon atoms, wherein the carbon atom attached to oxygen is also attached to at least one hydrogen, said radical containing an acidic substituent group, the substituent group containing at least one member of the class consisting of carboxylic, mercaptan, phenolic, sulfonic, phosphonic, arsonic and carbamic groups, with an inorganic siliceous material in a supercolloidal state of subdivision, having an average specific surface area of from 1 to 900 square meters per gram, an average particle diameter greater than about 1 millimicron, and a pH of about from 5 to 8, and having a reactive surface containing groups selected from the class consisting of silanol and heat-activated silicon-oxygen groups, while maintaining the water content of the system below about 5 per cent by weight of the alcohol in the system and the temperature in the range from 100° C. to the thermal decomposition temperature of the alcohol.

7. A process which comprises the step of chemically reacting an alcohol of the formula ROH in which R is a substituted hydrocarbon radical having from 2 to 18 carbon atoms, wherein the carbon atom attached to oxygen is also attached to at least one hydrogen, said radical containing an acidic substituent group containing at least one member of the class consisting of carboxylic, mercaptan, phenolic, sulfonic, phosphonic, arsonic and carbamic groups, with an inorganic siliceous material in a supercolloidal state of subdivision, having an average specific surface area of from 1 to 900 square meters per gram, an average particle diameter greater than about 1 millimicron, and a pH of about from 5 to 8, and having a reactive surface containing groups selected from the class consisting of silanol and heat-activated silicon-oxygen groups, while maintaining the water content of the system below about 5% by weight of the alcohol in the system and the temperature in the range from 100° C. to the thermal decomposition temperature of the alcohol until at least 100 —OR groups per 100 square millimicrons of surface area of said inorganic siliceous solid are chemically bound thereto.

References Cited in the file of this patent

UNITED STATES PATENTS

| | | |
|---|---|---|
| 2,395,880 | Kirk | Mar. 5, 1946 |
| 2,438,379 | Archibald et al. | Mar. 23, 1948 |
| 2,454,941 | Pierce et al. | Nov. 30, 1948 |
| 2,657,149 | Iler | Oct. 27, 1953 |